United States Patent Office 3,787,384
Patented Jan. 22, 1974

3,787,384
CATALYSTS AND PROCESS FOR THE POLYMERIZATION OF OLEFINS
Jacques Stevens, Braine-l'Alleud, and Michel George, Waterloo, Belgium, assignors to Solvay & Cie, Brussels, Belgium
No Drawing. Continuation-in-part of application Ser. No. 5,128, Jan. 22, 1970, now Patent No. 3,718,636. This application Mar. 5, 1971, Ser. No. 121,541
Claims priority, application France, Mar. 5, 1970, 7007852
The portion of the term of the patent subsequent to Feb. 27, 1990, has been disclaimed
Int. Cl. B01j 11/84; C08f 1/56, 3/06
U.S. Cl. 260—94.9 DA          4 Claims

ABSTRACT OF THE DISCLOSURE

The catalyst for the polymerization and copolymerization of olefins is composed of (a) at least one organometallic compound and (b) a solid catalytic component obtained by reacting a support comprised of silica, alumina or both silica and alumina with a compound of the formula $MR_nX_{m-n}$ in which M is aluminum or magnesium, R is a hydrocarbon radical, X is hydrogen or halogen, m is the valence of M and n is a whole number of not less than 1 nor greater than m, separating the solid product of the reaction, reacting this product with an excess of a halogen-containing transition metal compound and separating the solid reaction product. The polymerization of α-olefins and copolymerization of α-olefins with one another and with diolefins by means of the present catalysts are carried out with a high rate of productivity.

---

This is a continuation in part of our copending U.S. application Ser. No. 5,128 filed on Jan. 22, 1970, now Pat. No. 3,718,636.

BACKGROUND OF THE INVENTION

This invention relates to catalysts suitable for use in olefin polymerization and olefin copolymerization including, in particular, catalysts suitable for low-pressure olefin polymerization. This invention also concerns a method of polymerizing and copolymerizing olefins in the presence of a novel catalyst.

In our copending U.S. application Ser. No. 5,128, we have described catalysts suitable for use in the low-pressure polymerization and copolymerization of olefins and comprising:
(a) an organometallic compound, and
(b) a solid complex component obtained by reacting a solid compound of a bivalent metal with an impregnation agent comprising an organometallic compound, separating the solid product of this reaction, reacting this product with a halogen-containing compound of a transition metal, and separating the solid reaction product. The solid compound of a bivalent metal used to prepare component (b) may be a hydroxychloride, a partially hydroxylated halide, an oxide, a hydroxide, an alcoholate, a salt of an inorganic oxyacid, and an organic mono- or polycarboxylic acid salt of magnesium, calcium, zinc, manganese, cobalt or nickel.

Moreover, in U.S. Pat. No. 3,205,177, a method of preparing olefin polymerization catalysts has been described which comprises reacting a finely divided solid containing hydroxyl groups, e.g. a pyrogenic silica, first with an organic alkali metal compound, e.g. butyllithium, in a stoichiometrically calculated quantity with respect to the superficial OH groups of the solid, and then with a halide of a metal of Group VIIb of the Periodic Table, e.g. manganese hexachloride, in an amount equal to ⅓ gram mole per gram mole of alkali metal which has reacted with the solid. In combination with an organometallic compound of Group I, II or III of the Periodic Table, the resulting solid constitutes an olefin polymerization catalyst. The activity of these catalysts is very low, however; it is shown that they produce no more than 75 g. of polyethylene per g. of solid catalyst. In addition, this polyethylene has a molecular weight such that it is practically impossible to make use of it.

SUMMARY OF THE INVENTION

It is an object of the present invention to provide catalysts which are free from the disadvantages of those previously known and which have very high activity and lead to polymeric products which are commercially desirable.

According to the present invention, we have discovered a catalyst suitable for use in olefin polymerization and olefin copolymerization which comprises
(a) at least one organometallic compound, and
(b) a solid catalytic component obtained by reacting a support composed of silica, alumina or both silica and alumina with a compound of the formula $MR_nX_{m-n}$ in which M is aluminum or magnesium, R is a hydrocarbon radical containing 1 to 20 carbon atoms, X is hydrogen or a halogen, m is the valence of M, and n is a whole number not less than 1 nor greater than m, separating the solid product of the reaction, reacting said product with an excess of a halogen-containing transition metal compound, and separating the solid reaction product.

DESCRIPTION OF THE INVENTION

Where we refer to a support composed of both silica and alumina, or of silica and alumina together, we include aluminum silicates. Also, the term organometallic compounds, as used herein, includes organosilicon compounds.

Preferably, the support comprising silica, alumina or silica and alumina together is a solid prepared specifically for use as a catalyst support, for example, a silica or material comprising both silica and alumina, specifically prepared for use as a catalyst support in known processes for producing high density polyethylene. An alumina or the type used as a catalyst support may also be employed. The support preferably has a specific surface area greater than 150 m.²/g., a specific surface area greater than 300 m.²/g. being particularly preferred.

The granulometry of the support is not critical, except insofar as it governs that of the polymer or copolymer produced. To avoid clogging which may be caused by excessively fine support particles, the particle size range of the support is preferably 10 to 500 microns, more preferably 10 to 250 microns and most preferably 20 to 150 microns.

Before the reaction with $MR_nX_{m-n}$, it is advisable that the support be treated by prolonged heating at a high temperature to dry it as thoroughly as possible, and if appropriate, to activate it. The drying of the support is particularly important insofar as the compound $MR_nX_{m-n}$ is reactive with water.

In the compound of the formula $MR_nX_{m-n}$, the radical R may be saturated or unsaturated aliphatic, alicyclic, or aromatic hydrocarbon radical which contains 1 to 20 carbon atoms. If M is Al, m is 3 and n may be 1, or 3; and if M is Mg, m is 2 and n may be 1 or 2. As the compound of the formula $MR_nX_{m-n}$, we generally prefer to use a trialkylaluminum, e.g. trimethyl-, triethyl-, triisobutyl-tri-n-hexyl-, tri-isooctyl-, or trihexadecyl-aluminum. It is also possible to use an alkylaluminum diene polymer, e.g. an isoprenyl-aluminum polymer, or an alicyclic or aromatic derivative, e.g. triphenylaluminum, tricyclohexylaluminum, or tribenzylaluminum, or an alkylaluminum halide or hydride, e.g. dibutylaluminum hydride, diethylaluminum chloride or fluoride, dipropylaluminum bromide or ethylaluminum dichloride. The magnesium compounds of this formula which may be used include dialkylmagnesiums, e.g. dimethyl- or diethylmagnesium, diphenylmagnesium, and alkylmagnesium halides, which are also known as Grignard reagents and which are particularly preferred. Among the latter, mention may be made of butylmagnesium bromide and iodide, methylmagnesium iodide, ethylmagnesium chloride and phenylmagnesium chloride.

The productivity of the catalyst and the physical properties of the polymer are influenced by the nature of the compound of the formula $MR_nX_{m-n}$. Thus, in the polymerization of ethylene, the trialkylaluminums generally lead to polymers having a very low melt index which can be measured only under high load (as a "high load melt index"). On the other hand, magnesium compounds of the formula $MR_nX_{m-n}$ provide catalysts yielding polyethylenes of moderate molecular weight, but high critical shearing tension, and relatively narrow molecular weight distribution; these properties are generally incompatible, but they are nevertheless highly desirable.

The reaction between the support and the compound of the formula $MR_nX_{m-n}$ may be carried out according to any procedure compatible with the properties of the particular compound $MR_nX_{m-n}$ which is used. Thus, $MR_nX_{m-n}$ may be used in the gas or vapor state, either undiluted or mixed with an inert gas; or in the liquid state, either undiluted or diluted by an inert liquid, so as to form a suspension of the solid support. In a preferred procedure for this reaction, the support is first suspended in a diluent; in general the diluent may be an alkane, e.g. hexane, a cycloalkane, e.g. cyclohexane, or an ether, e.g. diethyl ether or tetrahydrofuran. Preferably, the reaction is carried out in a closed vessel flushed with an inert gas such as nitrogen and the reaction mixture is agitated throughout the reaction period. The compound $MR_nX_{m-n}$, either by itself or dissolved in a solvent, can then be added to the suspension of the support in the diluent. The solvent may be identical with the diluent in which the support is suspended.

The period for the reaction between the support and $MR_mX_{m-n}$ is not critical, but generally the reaction is continued for about from 10 minutes to 24 hours. In the majority of cases, thirty minutes are sufficient. Throughout the reaction period, it is advisable for the suspension of the support to be kept at a temperature between ambient temperature and the boiling point of the diluent at atmospheric pressure. The temperature is preferably maintained at 25° to 60° C. The concentration of the compound $MR_nX_{m-n}$ in the suspension is not critical provided it is above the amount which corresponds to that which can be fixed on the support.

At the end of the reaction period, agitation having been stopped, the solid product of the reaction is separated, for example, by filtration, and preferably it is then washed with an inert solvent so as to eliminate any excess of the compound $MR_nX_{m-n}$.

In the next stage of the preparation of the solid catalytic component (b), the solid reaction product of $MR_nX_{m-n}$ and the support is reacted with a halogen-containing compound of a transition metal, e.g. a metal of Group IVb, Vb, or VIb of the Periodic Table, and preferably titanium, vanadium, zirconium or chromium. The best results have been obtained with halogen compounds of titanium. The transition metal compound may be a halide, an oxyhalide or an alkoxyhalide. We prefer to use a bromine or chlorine compound. When use is made of a compound containing one or more alkoxy radicals, the alkoxy groups are preferably linear or branched radicals which contain from 1 to 20 carbon atoms, and more particularly 1 to 10 carbon atoms. Examples of compounds which may be used are: $TiCl_4$, $TiBr_4$, $VCl_4$, $VOCl_3$, $VOBr_3$, $CrO_2Cl_2$, $Ti(OC_2H_5)_3Cl$, $Ti(OiC_3H_7)_3Cl$, $Ti(OC_2H_5)_2Cl_2$ and $Ti(OiC_3H_7)Cl_3$. The best results are obtained with $TiCl_4$.

This reaction should be performed, as specified above, with an excess of the halogen-containing transition metal compound. We prefer to carry out the reaction in the absence of diluent and at atmospheric pressure, with the above described solid reaction product suspended in the halogen-containing transition metal compound, which is kept in the liquid state at the reaction temperature. Usually the reaction is carried out at a temperature of about 0 to 300° C. and more preferably at a temperature of about 40° to 180° C. During the reaction, the reactants should be protected from moisture; the reaction should be continued for a sufficient period to ensure that the halogen-containing transition metal compound is chemically bonded to the solid reaction product of $MR_nX_{m-n}$ and the support. The bonding of the transition metal compound is generally achieved at the end of about an hour. After the reaction, the catalytic component (b), which is likewise solid is separated and if desired, it may be subjected to extraction employing the halogen-containing transition metal compound used for the reaction. After this, the solid catalytic component (b) may be washed with an inert hydrocarbon solvent, e.g. butane, pentane, hexane, heptane, cyclohexane, methylcyclohexane, or a mixture of two or more of these compounds. Excess reactant and by-products of the reaction, which may have been adsorbed on the surface of the catalytic component (b) are thereby eliminated; the catalytic component may then be dried, for example, in a current of inert gas.

After the reaction with the compound $MR_nX_{m-n}$, and after the reaction with the halogen-containing transition metal compound, the solid support and the two compounds just mentioned are chemically bonded. None of these components of product (b) can be separated by physical means, e.g. washing with solvents. The analysis of product (b) after washing shows, in fact, that it does contain the transition metal concerned in an amount greater than 0.1 mg./g. and generally greater than 1 mg./g., which shows that there has definitely been a chemical bonding of the transition metal compound.

The content of $MR_nX_{m-n}$ and the transition metal compound in the catalytic component (b) has an influence on the properties of the polymer formed; as a rule, it is found that the higher the content of the transition metal compound in the catalytic component (b), the higher the critical shearing tension of the polymer will be.

The catalysts according to the present invention also contain the organometallic compound designated above as component (a); this may be the same as or different from the compound $MR_nX_{m-n}$. Preferably, component (a) comprises an organometallic compound of the formula $M'R_qZ_{p-q}$, where $M'$ is a metal of Group Ia, IIa, IIb, IIIa, or IVa of the Periodic Table, e.g. lithium, magnesium, zinc, aluminum or tin, $R'$ is a hydrocarbon radical containing from 1 to 20, preferably 1 to 10 carbon atoms, and $Z$ is a halogen atom, a hydrogen atom, or a monovalent alkoxy or dialkylamino radical, preferably the alkoxy and dialkylamino radicals contain from 1 to 8 carbon atoms and most preferably from 1 to 4 carbon atoms, $p$ is the valence of $M'$ and $q$ is a whole number not less than 1 nor greater than $p$. The best results are obtained with the alkylaluminums.

As component (a), a completely alkylated compound, the alkyl chains of which generally contain from 1 to 20 carbon atoms, preferably 1 to 10 carbon atoms, and may be straight or branched, may be used. n-Butyllithium, diethylmagnesium, diethylzinc, trimethylaluminum, triethylaluminum, triisobutylaluminum, trioctylaluminum, tridecylaluminum, tri-n-dodecyl-aluminum or tetrabutyltin are examples of suitable alkylated organometallic compounds. An alkylaluminum hydride, in which the alkyl radicals, as before contain from 1 to 20 carbon atoms, preferably 1 to 10 carbon atoms, may also be employed as component (a); thus diisobutyl-aluminum hydride or trimethyltin hydride, for example, may be used. Alkyl metal halides in which the alkyl radicals preferably contain from 1 to 20 carbon atoms, preferably 1 to 10 carbon atoms, may likewise be used; thus ethylaluminum sesquichloride, diethylaluminum chloride or diisobutylaluminum chloride may be used. Still further compounds which may be used as component (a) are the alkyl radical containing compounds of silicon containing at least one Si—R bond. Finally, as component (a), use may also be made of an organoaluminum compound obtained by reacting a trialkylaluminum or a dialkylaluminum hydride, the alkyl radicals of which contain from 1 to 20 carbon atoms, with diolefins containing from 4 to 20 carbon atoms. These compounds include those which are commonly called isoprenylaluminums.

The catalysts of the present invention are suitable for use in the polymerization of olefins having terminal unsaturation, the molecules of which contain from 2 to 18 carbon atoms, more preferably from 2 to 6 carbon atoms, e.g. ethylene, propylene, butene-1, 4-methylpentene-1, and hexene-1. They are also suitable for use in the copolymerization of $\alpha$-olefins with one another and also with diolefins, preferably diolefins containing 4 to 18 carbon atoms. The diolefins may be nonconjugated aliphatic diolefins, e.g. hexadiene-1,4; nonconjugated monocyclic diolefins, e.g. 4-vinylcyclohexene, 1,3-divinylcyclohexane, cycloheptadiene-1,4- or cyclooctadiene-1,5; alicyclic diolefins having an endocyclic bridge, e.g. dicyclopentadiene, or norbornadiene, or conjugated aliphatic diolefins, e.g. butadiene or isoprene.

The catalysts of the present invention are particularly useful for the production of ethylene homopolymers and of copolymers containing at least 90 mol percent, preferably at least 95 mol percent of ethylene.

The polymerization may be carried out by any applicable process; e.g. in solution, in suspension in a solvent or a hydrocarbon diluent, or in the gas phase. For processes in solution or in suspension, use may be made of inert hydrocarbon solvents or diluents similar to those used for washing component (b), these preferably comprising one or more aliphatic or cycloaliphatic hydrocarbons, e.g. butane, pentane, hexane, heptane, cyclohexane, methylcyclohexane, or a mixture of two or more thereof. It is also possible to carry out the polymerization in the monomer or one of the monomers, the respective monomer being kept in the liquid state.

The pressure employed in the polymerization may generally be between atmospheric pressure and 100 kg./cm.$^2$ and is, preferably 5 to 50 kg./cm.$^2$. The temperature may generally be kept between 20 and 120° C., and is preferably between 60 and 100° C. The polymerization may be carried out continuously or discontinuously.

The catalyst may be formed in situ by adding component (a) and component (b) separately to the polymerization medium. It is also possible to bring component (a) and component (b) into contact at a temperature between —40 and 80° C. for a period of (e.g.) up to 2 hours before introducing them into the polymerization reactor. It is further possible to bring component (a) and component (b) into contact in a plurality of stages, or still further, to add only a part of component (a) upstream of the reactor, or to add a plurality of different organometallic compounds as component (a).

The total amount of component (a) is not critical; generally component (a) may be used in an amount of about 0.02 to 5 millimole/dm.$^3$ of solvent, diluent, or reactor volume and preferably 0.2 to 5 millimole/dm.$^3$. The amount of component (b) employed may be determined according to the content of transition metal therein. The amount of component (b) should generally be sufficient to provide a concentration of 0.001 to 2.5 milligram-atom, preferably 0.01 to 0.25 milligram-atom of the transition metal per dm.$^3$ of solvent, diluent, or reactor volume.

The ratio of the amounts of component (a) and component (b) is also not critical. Generally the ratio of component (a) to the transition metal, expressed in moles per gram atom of transition metal is greater than 1, and preferably greater than 10; most preferably the ratio of component (a) to the transition metal is in the range of 1.0 to 100.

The average molecular weight of the polymers obtained by the use of a catalyst according to the present invention can be adjusted by introducing into the polymerization medium one or more molecular weight modifying agents, e.g. hydrogen, diethylzinc or diethylcadmium, alcohol, or carbon dioxide.

The specific gravity of the homopolymers obtained by the use of a catalyst according to the present invention may also be adjusted by adding to the polymerization medium an alkoxide of a metal of Group IV$b$ or V$b$ of the Periodic Table. Thus it is possible to obtain polyethylenes of a specific gravity intermediate between those of polyethylenes obtained by a high pressure process and those of ordinary high density polyethylenes. The alkoxides which are suitable for this purpose include in particular, those of titanium and vanadium, the alkyl radicals of which contain from 1 to 20 carbon atoms, e.g. $Ti(OCH_3)_4$, $Ti(OC_2H_5)_4$, $Ti(OC_8H_{17})_4$ and $Ti(OC_{16}H_{33})_4$.

By means of the catalysts of the invention polyolefins may be produced with remarkably high productivity. Thus, in the homopolymerization of ethylene, the productivity expressed in grams of polyethylene per gram of component (b) exceeds 100 and even frequently exceeds 500. Moreover, the content of transition metal in component (b) can be relatively low. Consequently, the amount of transition metal present as a catalyst residue in the polymer is likewise low. As a result the polymer does not need to be purified before being used, and this constitutes a very appreciable gain because purification can be the most expensive and most delicate operation in the working up of the polymer.

With the aid of the catalysts of the present invention, it is possible to produce polyethylene having a low melt index and a high critical shear tension, with a narrow molecular-weight distribution; these properties are extremely difficult to combine by known techniques.

Polyolefins having these properties are particularly valuable for applications requiring extrusion or extrusion-blowing. They make it possible to adopt particularly high extrusion speeds without melt fracture phenomena occurring, despite their narrow distribution of molecular weights.

The following examples illustrate the best mode currently contemplated for carrying out the invention but must not be construed as limiting the invention in any manner.

EXAMPLE 1

Ketjen 003 P gamma alumina was screened after grinding and the fraction between 0.65 and 125 microns separated.

The alumina was dried at 400° C. for 16 hours in a current of dry nitrogen.

Twenty g. of the dried alumina was suspended in 100 ml. of hexane in an atmosphere of nitrogen and 0.15 gram mol of the Grignard reagent, $(C_2H_5)MgCl$ dissolved in ether was added progressively to the suspension which was kept at ambient temperature. (This Grignard reagent was a commercial product). The mixture was agitated for 30 minutes. The solid product obtained was filtered, washed with dry ether to eliminate the excess organomagnesium compound, and dried under reduced pressure. The product contained 52 g. of magnesium per kg.

This solid product was then subjected to treatment with pure $TiCl_4$, with which it was refluxed at 136° C. for 1 hour. The solid product resulting from this treatment was then washed with hexane until the last traces of $TiCl_4$ were eliminated, and dried at 60° C. in a current of dry nitrogen. The product contained 46 g. of magnesium, 33 g. of titanium, and 196 g. of chlorine per kg. The Mg/Ti atomic ratio was 2.75.

Forty-eight mg. of the product formed in this manner was introduced together with 100 mg. of triisobutylaluminum into a 1.5-liter stanless steel autoclave containing 0.5 liter of hexane. The ratio of triisobutylaluminum/titanium, expressed by the atomic ratio Al/Ti, was 14. The autoclave was equipped with a blade-type agitator. The temperature in the autoclave was raised to 85° C. and ethylene and hydrogen were introduced under respective partial pressures of 10 and 4 kg./cm.² . The temperature was kept constant for one hour, during which time the pressure was also kept constant by adding ethylene. After degasifying the autoclave, 30 g. of polyethylene were collected, which corresponded to a catalyst activity of 60 g. of polyethylene per hour per gram of solid per kg./cm.² of ethylene, or 1720 g. of polyethylene per hour per gram of fixed titanium per kg./cm.² of ethylene.

The polyethylene obtained had a melt index of 0.26 g. per 10 minutes, measured according to the standards ASTM D 1505–57 T and ISO/R 292–1963.

The molecular weight distribution of this polyethylene was evaluated by determining the $C_D$ coefficient as defined in French Pat. 1,582,942 wherein $C_D$ is defined by the equation $$C_D = \frac{0.235 \cdot 10^9}{\gamma_1 \mu_1^{1.294}}$$

In the equation, $\gamma_1$ and $\mu_1$ represent the values of the viscosity measured in poises at 190° C. for low speed gradient, and of the speed gradient defined by the intersection of the horizontal tangent of a curve obtained by plotting on a bilogarithmic diagram the variation of melt viscosity at constant temperature along the Y axis and speed gradient along the X axis and of the asymptote of the curve for values of the speed gradient close to infinite.

The following relationship exists between the melt viscosity and the speed gradient at constant temperature.

$$\log \frac{\mu}{\mu_1} = \left(\frac{\mu}{\mu^1} - 2\right) \log \left[1 + \left(\frac{\gamma}{\gamma_1}\right)^{1/3}\right]$$

Thus, in addition to the measurement of $\mu_1$, which is a viscosity in which the speed gradient is equal to zero, a single measurement of the melt viscosity at a known shear rate allows the determination of the value $\gamma_1$.

The viscosity measurements were made in an apparatus of the type described in the Journal of Applied Physics, 1957, volume 28, No. 5, page 624.

The higher the $C_D$ coefficient, the higher the dispersion of molecular weights. The polyethylene of this test had a $C_D$ coefficient lower than 6.

The critical shear tension at which the extruded ring becomes rough (melt fracture phenomenon) is measured in a melt index measuring apparatus provided with a specially adapted die (length: 2 mm. instead of 8). This was found to be higher than $11.5 \times 10^6$ dynes/cm.².

It will be seen that by using alumina impregnated with RMgX, in which R is an alkyl radical and X is a halogen atom, it is possible to obtain polyethylene having a narrow molecular weight distribution, in combination with a high critical shear tension. When a catalyst of magnesium oxide treated with triethylaluminum is used, as described in Example 2 of our copending application Ser. No. 5,128, the polyethylene obtained has a wider molecular weight distribution.

EXAMPLE 2

Davison Grade 969 MS silica was ground, and the fraction between 0.65 and 125 microns was separated by screening. The silica was subjected to drying at 280° C. for 16 hours in a current of dry nitrogen. It was next treated as in Example 1. The solid product obtained after the first impregnation contained 48 g. of magnesium per kg. The solid product resulting from the complete treatment contained 43 g. of magnesium, 42 g. of titanium and 191 g. of chlorine per kg. The atomic ratio Mg/Ti is 2.02.

The solid product thus formed in an amount of 105 mg. was introduced together with 200 mg. of triisobutylaluminum into a 1.5-liter autoclave containing 0.5 liter of hexane. The ratio of activator, i.e. component (a) to fixed titanium, expressed by the Al//Ti atomic ratio, was 11.55. Polymerization took place as described in Example 1.

Fifty-four g. of polyethylene was obtained, which corresponded to a catalyst activity of 50 g. of polyethylene per hour per gram of support per kg./cm.² of ethylene, or 1225 g. of polyethylene per hour per gram of titanium per kg./cm.² of ethylene.

The polyethylene obtained had a melt index of 0.4 g. per 10 minutes, a critical shear tension higher than $11.5 \times 10^6$ dynes/cm.², and a molecular weight distribution coefficient lower than 6.

The support based on $SiO_2$ thus gave a less active catalyst than the catalyst based on $Al_2O_3$ employed in Example 1, but the polyethylene obtained had a higher melt index while the narrow molecular weight distribution and very high critical shear tension were retained.

EXAMPLE 3

Ketjen 003 P gamma alumina which had been prepared as described in Example 1, was dried at 250° C. for 16 hours in a current of dry nitrogen.

Ten g. of the dried alumina was suspended in 50 ml. of hexane in an atmosphere of nitrogen, and 0.018 gram mol of $Al(C_2H_5)_3$ dissolved in hexane was added dropwise. Agitation was continued for 30 minutes at ambient temperature. The solid product obtained was filtered and washed with hexane. It was then refluxed with $TiCl_4$ at 136° C. for 1 hour. The solid product thus obtained was washed with hexane until all traces of chloride had been eliminated, and was dried in a current of dry nitrogen. The product contained 71 g. of titanium and 207 g. of chlorine per kg.

The thus-formed product in an amount of 150 mg. was introduced together with 100 mg. of triisobutylaluminum into a 1.5-liter autoclave containing 0.5 liter of hexane. The ratio of activator to fixed titanium expressed by the atomic ratio Al/Ti, was 2.4.

The polymerization of ethylene was then carried out under conditions as described in Example 1.

After degasifying the autoclave, 39 g. of polyethylene was obtained, which corresponded to a catalyst activity of 368 g. of polyethylene per hour per gram of Ti per kg./cm.² of ethylene.

The polyethylene had a high load melt index (HLMI) of 1.55 g. per 10 minutes.

It can be seen that the nature of the compound $MR_nX_{m-n}$ has an influence upon the properties of the polymer. Thus triethylaluminum leads to polymers having a much lower melt index than ethylmagnesium chloride.

EXAMPLE 4

Ground Davison grade 969 MS silica was heated at 600° C. for 16 hours in a current of dry nitrogen, and then treated, as indicated in Example 3, first with $Al(C_2H_5)_3$ and then with $TiCl_4$.

The solid obtained contained 22 g./kg. of Al, 56 g./kg. of Ti, and 164 g./kg. of Cl.

The polymerization of ethylene, employing a catalyst derived from 190 mg. of this solid and 100 mg. of triisobutylaluminum, under the conditions indicated in Example 3, gave 30 g. of polyethylene having a high load melt index (21.3 kg.) of 0.32 g. per 10 minutes. The catalyst activity was 720 g. of polyethylene per hour per gram of Ti per kg./cm.² of ethylene.

What we claim as new and desire to secure by Letters Patent is:

1. A process for the polymerization of ethylene which is carried out in the presence of a catalyst comprising
   (a) an alkylaluminum, the alkyl group of which contains from 1 to 20 carbon atoms,
   (b) a solid complex component obtained by reacting a support of silica, alumina or both silica and alumina with an excess above that which can be chemically fixed on said support of an organomagnesium compound of the formula $M_gR_nX_{2-n}$, in which R is a hydrocarbon radical containing 1 to 20 carbon atoms, X is hydrogen or halogen and $n$ is 1 or 2, separating the solid product of the reaction, washing the solid product of the reaction with an inert solvent to eliminate any excess of organomagnesium compound not chemically fixed on said support, reacting said thus washed product with an excess of a liquid halogen-containing compound of titanium, separating the solid reaction product and washing the solid reaction product with an inert solvent to eliminate any excess of halogen-containing compound of titanium not chemically fixed thereto.

2. A process according to claim 1 in which said solid complex component (b) is obtained by reacting said support with an excess of alkyl magnesium halide.

3. A catalyst useful for the polymerization of ethylene which comprises (a) an alkylaluminum, the alkyl group of which contains from 1 to 20 carbon atoms, (b) a solid complex component obtained by reacting a support of silica, alumina or both silica and alumina with an excess above that which can be chemically fixed on said support of an organomagnesium compound of the formula $M_gR_nX_{2-n}$, in which R is a hydrocarbon radical containing 1 to 20 carbon atoms, X is hydrogen or halogen and $n$ is 1 or 2, separating the solid product of the reaction, washing the solid product of the reaction with an inert solvent to eliminate any excess of organomagnesium compound not chemically fixed on said support, reacting said thus washed product with an excess of a liquid halogen-containing compound of titanium, separating the solid reaction product and washing the solid reaction product with an inert solvent to eliminate any excess of halogen-containing compound of titanium not chemically fixed thereto.

4. A catalyst according to claim 3 in which said solid complex component (b) is obtained by reacting said support with an excess of alkyl magnesium halide.

References Cited

UNITED STATES PATENTS

| | | | |
|---|---|---|---|
| 3,205,177 | 9/1965 | Orzechowski et al. | 260—94.9 DA |
| 3,202,645 | 8/1965 | Yancey | 260—94.9 |
| 3,513,150 | 5/1970 | Matsuura et al. | 260—94.9 |
| 3,324,101 | 6/1967 | Baker et al. | 260—94.9 |
| 3,594,330 | 7/1971 | Delbouille et al. | 260—94.9 |
| 3,058,963 | 10/1962 | Vandenberg | 260—88.2 |

FOREIGN PATENTS

| | | |
|---|---|---|
| 2,000,834 | 9/1970 | Germany. |
| 817,887 | 8/1959 | Great Britain. |

JOSEPH L. SCHOFER, Primary Examiner

E. J. SMITH, Assistant Examiner

U.S. Cl. X.R.

252—429 C; 260—85.3 R, 88.2 R, 93.7